United States Patent [19]

Cohen

[11] Patent Number: 4,531,272
[45] Date of Patent: Jul. 30, 1985

[54] VALVE ASSEMBLY METHOD

[76] Inventor: Frederick Cohen, 1500 W. Church St., Orlando, Fla. 32803

[21] Appl. No.: 164,037

[22] Filed: Jun. 30, 1980

[51] Int. Cl.³ .......................... B23P 15/00; B23P 7/00
[52] U.S. Cl. ............................. 29/157.1 R; 29/402.08; 137/315; 228/135
[58] Field of Search ...................... 29/157.1 R, 402.08; 251/356, 357; 137/315, 329, 329.01; 228/135

[56] References Cited

U.S. PATENT DOCUMENTS

| | | | |
|---|---|---|---|
| 521,040 | 6/1894 | Oliver | 251/215 |
| 607,492 | 7/1898 | Thomas et al. | 137/315 |
| 1,736,253 | 11/1929 | Collar | 251/215 |
| 2,145,168 | 1/1939 | Flagg | 228/135 |
| 3,067,764 | 12/1962 | Geary | 137/315 |
| 3,352,532 | 11/1967 | Mooney et al. | 251/357 |
| 3,467,133 | 9/1969 | Justis, Sr. | 251/215 |
| 4,134,420 | 1/1979 | Okonowitz | 137/315 |
| 4,176,674 | 12/1979 | Rodriquez | 137/315 |
| 4,239,055 | 12/1980 | Van Coffman | 137/315 |
| 4,240,462 | 12/1980 | Bankstahl | 137/377 |

FOREIGN PATENT DOCUMENTS 222910  11/1958  Australia .............................. 251/215

*Primary Examiner*—Daniel C. Crane
*Attorney, Agent, or Firm*—William M. Hobby, III

[57] ABSTRACT

A method of making a replacement valve assembly, and the replacement valve assembly are provided in which an existing valve assembly is removed from the valve and used as a guide to make the replacement valve assembly. A threaded rod is cut to a length in accordance with the removed existing valve assembly and stock sleeve material having an internally threaded bore therethrough matching the external threads on the threaded rod is cut in accordance with the existing valve assembly to form a stem on the replacement valve. The valve assembly operating threads are cut from a piece of stock material having an internally threaded bore and a matching valve element is selected to match the one on the existing valve assembly. The externally threaded rod is coated with flux and a liquid solder or is cleaned and coated with a polymer adhesive and the cut and selected items assembled thereon to form the replacement valve assembly. The assembled unit is heated with a torch if solder is used or is cured in the case of a polymer adhesive. In most cases, the handle attaching stem portion having an internal threaded bore is attached to one end of the cut threaded rod and an internally threaded washer may be attached where a stop is required for the valve assembly. Washers and O-rings and miscellaneous items are also required.

14 Claims, 4 Drawing Figures

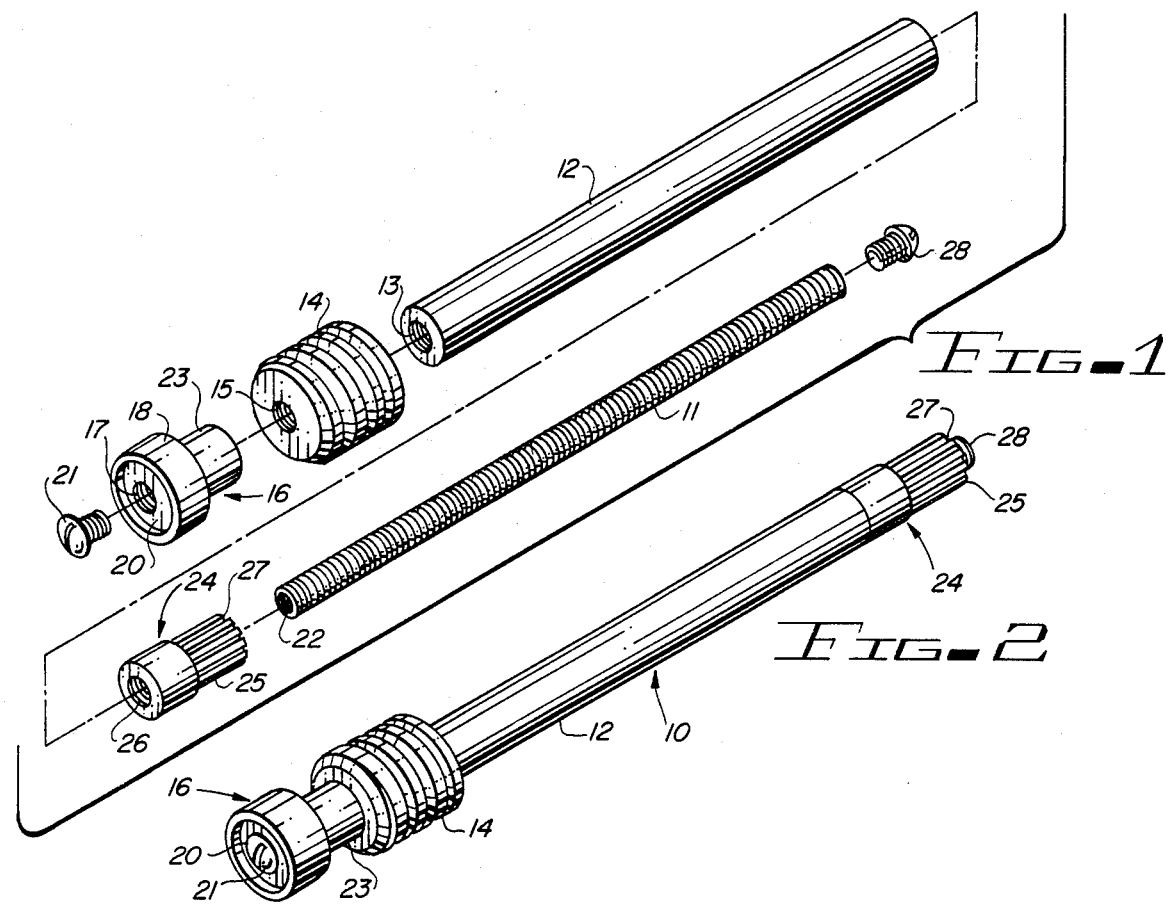
FIG-1
FIG-2
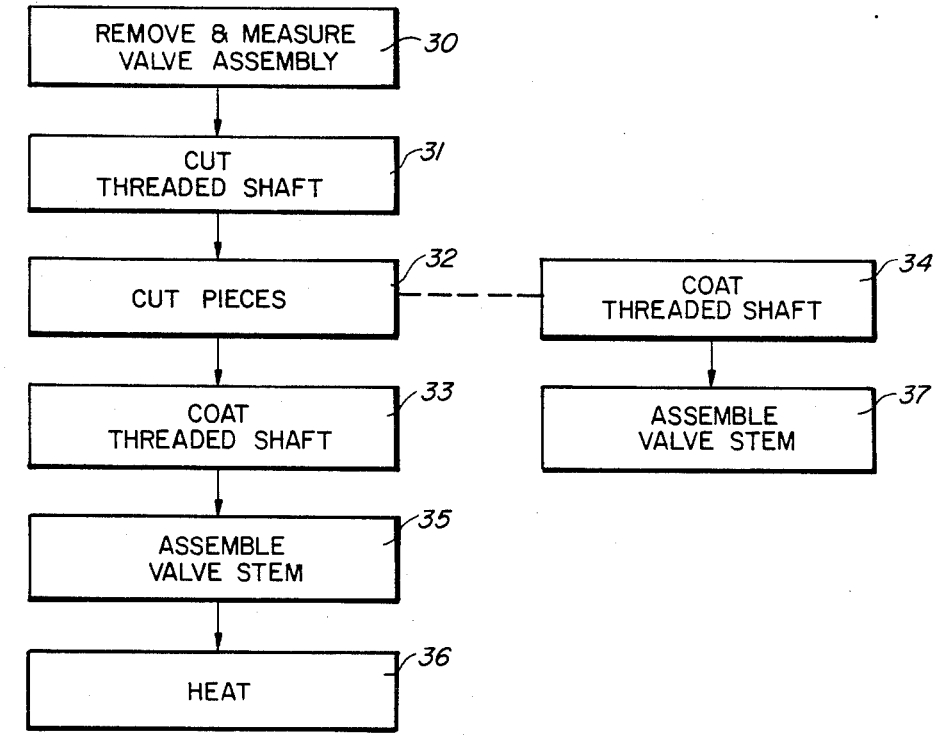
FIG-3

VALVE ASSEMBLY METHOD

BACKGROUND OF THE INVENTION

The present invention relates to replacement valve assemblies for existing valves which can be made on site by a plumber or rapidly assembled by a plumbing supply house.

In the past, there have been several hundred different valve assemblies used for a variety of valves. In the absence of any real standardization, each valve manufacturer has different valve assemblies which are not interchangeable with other manufacturers and one manufacturer may have dozens of valve assemblies which are not interchangeable with each other. A typical example is where one manufacturer has the same valve element and operating threads for a variety of valve assemblies, but with each assembly having a different length stem and therefore not being interchangeable. That is, some of the valves require longer stems than others, such as the valve assembly for a shower may require a longer stem than the same valve assembly in a lavatory fixture. The valve assemblies multiply as a manufacturer over the years changes his design of valves and fixtures. Many valve assemblies are manufactured by companies long out of business and replacement parts become very difficult to locate or impossible to obtain. In addition, small foreign manufacturers do not have large distribution within a country, and may also not have replacement valve assemblies available. This results in plumbing supply houses having to carry in inventory large numbers of replacement valve assemblies and still not being able to have all of the assemblies which may be needed by a plumber. So that many suppliers carry no replacement parts, it also requires a plumber trying to replace a valve assembly having to drive to different plumbing supply houses looking for a replacement valve assembly. If no replacement valve assembly is available, the entire valve fixture has to be replaced. Replacing the entire fixture may substantially increase the cost, such as in home bathroom showers, where a portion of the wall and the tile have to be removed to gain access to replace the valve assembly, and then the wall repaired. The repair on the wall may not be satisfactory because the tile used in older bathrooms may no longer be available to make the repairs with, so that the replacement tiles do not quite match the original tiles. The present invention is directed toward a valve assembly which can be readily made up by the plumber or by the plumbing supply house from a kit requiring substantially fewer parts than the number of different replacement valves. It also, advantageously allows a plumber or plumbing supply house to replace valve assemblies which are not available and to use valve assemblies with slightly enlarged components to correct for the substantial wear that can occurr over long periods of use of a valve. The stems needed for gate valves that are buried can easily be replaced without disturbing the piping or removing the valve body.

SUMMARY OF THE INVENTION

A method of making a replacement valve assembly is provided which includes the steps of removing an existing valve assembly and cutting a threaded rod to a predetermined length in accordance with the removed valve assembly, then cutting a sleeve having an internally threaded bore therethrough to match the external threads on the cut and threaded rod to make a stem portion in accordance with the removed existing valve assembly. A threaded rod to match the operating threads of the valve assembly and having a threaded bore therethrough to match the external threads of the cut threaded rod is cut in accordance with the removed existing valve assembly. A valve element to match the existing valve assembly is selected which may or may not require cutting. A handle attaching stem portion having an internally threaded bore therein to fit the cut threaded rod is selected. A coating material is applied to the cut threaded rod for binding the cut and selected components to the threaded rod and the cut sleeve, cut threaded rod having the threaded bore therein, a selected valve element, and handle stem portion are assembled onto the coated cut threaded rod. If the coating is a liquid solder, a flux is first applied to the threaded rod and the assembled replacement valve assembly is heated with a torch or the like to bind the components together, or if the coating of the threaded rod is with a polymer adhesive, the adhesive is cured prior to replacing the existing valve assembly. Other components, such as a threaded washer to act as a stop for the valve assembly, are also required for some valves.

BRIEF DESCRIPTION OF THE DRAWINGS

Other objects, features and advantages of the present invention will be apparent from the written description and the drawings, in which:

FIG. 1 is an exploded perspective view of a replacement valve assembly;

FIG. 2 is a perspective view of an assembled replacement valve assembly;

FIG. 3 is a flow diagram of the method in accordance with the present invention.

DESCRIPTION OF THE PREFERRED EMBODIMENTS

Figure 4:
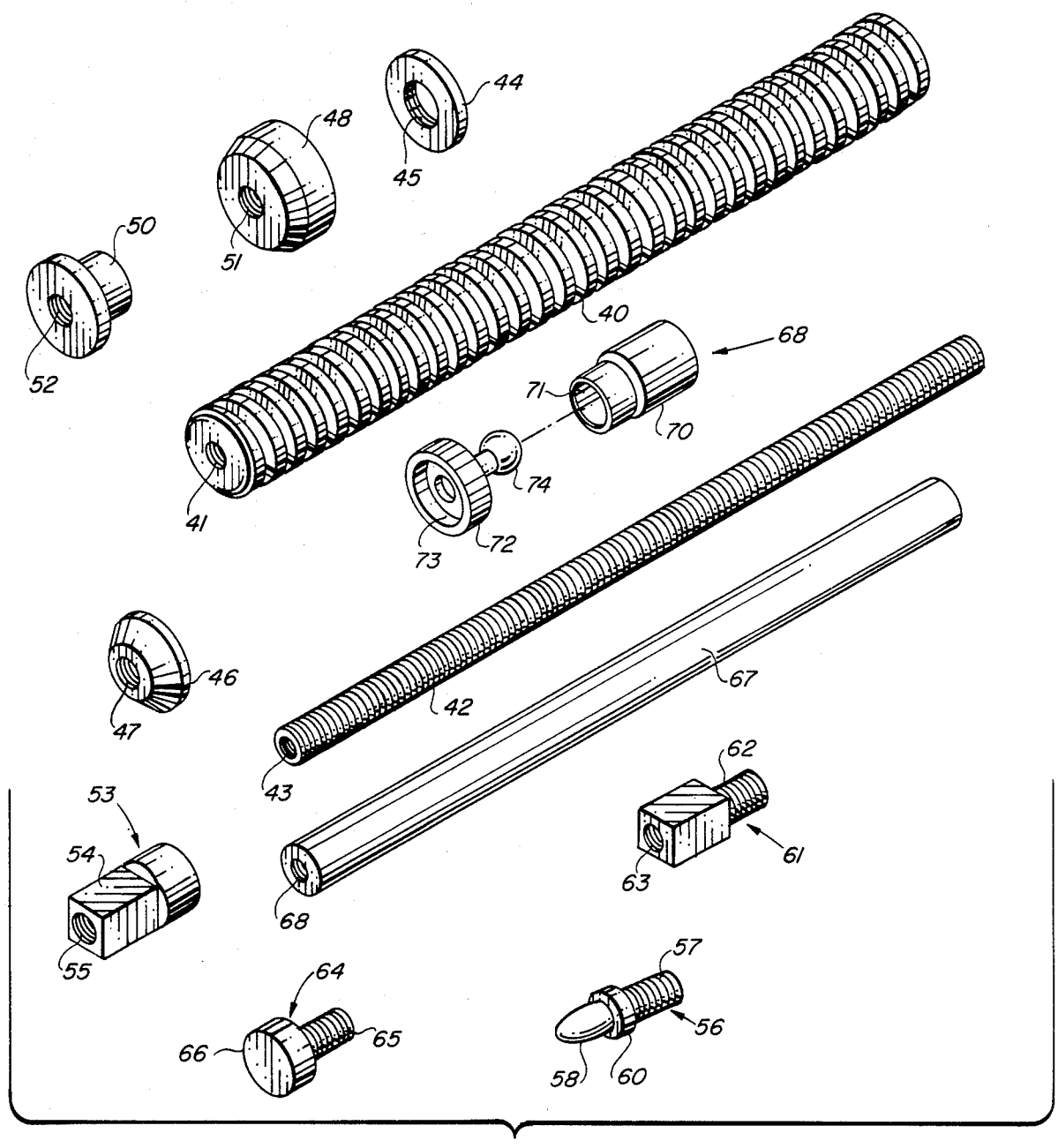
FIG. 4 is a perspective view of a group of typical components used to assemble a replacement valve.

Referring to the drawings, and especially to FIGS. 1 and 2, a replacement valve assembly 10 is illustrated in an assembled and disassembled format, and has a threaded rod 11 forming a center core, a stem sleeve portion 12 which has an internally threaded bore 13 to match the externally threaded rod 11. The threaded rod 11 is cut from a longer piece of stock to be of the size to form the replacement valve 10 in accordance with an existing valve assembly removed from a valve. The operating threads 14 are cut from a longer stock material and have an internally threaded bore 15 also to match the external threads of the threaded rod 11. A valve element 16 has a threaded bore 17 with internal threads adapted to fit the externally threaded rod 11 and has a disc portion 18 which forms a recess area 20 for holding a valve washer. A brass screw 21 can be sized to fit a small internally thread opening 22 in the rod 11 and this can be accomplished by having the threaded bar stock from which the rod 11 is made, drilled and tapped at each end so that at least two of the rods 11 cut from the stock material will have an opening 11 therein. The valve element 16 has a stem portion 23 which can be longer if desired and be cut off to the predetermined size for a particular valve being replaced. The handle attaching stem portion 24 has a fluted section 25 and a threaded bore 26 extending thereinto and adapted to be attached to the threaded roll 11. The end 27 of the handle attaching portion might be drilled and tapped for a brass screw 28 for attaching the handle. The parts illustrated in this embodiment can be assembled as shown in FIG. 2 by threading each of the parts onto the rod 11 in the predetermined position to form the valve. In addition, additional parts can be added to the valve assembly, such as a threaded washer threaded to fit the rod 11 to be placed between the operative threads 14 and the valve element 16 to form a stop in some valve assemblies. In addition, a second piece of stem stock 12 can be cut and inserted between such a stop and the operative threads 41, which when in place is dressed with a file at the leading thread. It is, of course, anticipated that a washer will fit in the recess 20 and O-rings and packing might be utilized in assembling a replacement valve assembly.

In the process as illustrated in FIG. 3, an old valve is removed and examined or measured in step 30 and the rod 11 is cut to a predetermined size in 31. The operating threads 14, stem member 12, valve element 16, and portion 23 are all cut in accordance with the removed valve assembly in step 32 and the cut pieces are sanded, filled or abraded to smooth the cut edges. The threaded rod 11 may be coated with a liquid or paste solder in step 33, or alternatively, coated with a polymer adhesive in step 34. Once the rod 11 is coated all of the elements that have been cut to size and selected are assembled onto the threaded rod 11 in step 35. In the case of liquid solder, a flux, such as an acid flux, is first applied to rod 11, then the solder and the elements are heated with a torch in step 36 to bind the components together. In the case of a polymer adhesive, the rod 11 may need to be cleaned with cleaning solvent and the parts assembled in step 37 over the adhesive, which is cured to form the assembled replacement valve assembly. Thus, the rod 11, and stem portion 12 are cut to size from longer stock, while the operative threads 14 must be selected to match the existing threads and cut to size and the valve element 16 must be selected, and in some cases, cut to size. Similarly, the handle attaching portion of the stem 24 must be selected to match the handles on the valve assembly. If a stop is required, it must also be selected to match the existing valve so that parts must be selected and cut to size in accordance with the existing valve assembly, then the threaded portion 11 must be coated and all of the parts assembled to match the existing valve. The center rod 11 can be of stainless steel for extra strength or of other metal if desired, while the remaining components can be of stainless steel, or more commonly, made of brass. In operation, all of the components would be made to fit one type of shaft 11 which would be maintained in a kit and only a few sized stem sleeves 12 would normally be required and each could be cut to the particular size desired. Similarly, a few pieces of operating thread stock would cover a large number of valves, since any one manufacturer would typically use the same Acme or other threads. A larger number of valve elements 16 would be required for the kit to meet the requirements of most valve assemblies. The handle attaching stem portion 24 can be inventoried for most valves and each manufacturer would typically have most of the handle attaching portions the same, which are usually either a fluted cylinder or a square, and so as to engage the handle during turning, which handle is held into place by a screw 28.

Referring now to FIG. 4, a sampling of stock materials for a kit in accordance with the present invention is illustrated in which the operating threads 40 is an elongated piece having a threaded bore 41 therethrough, even though only small portions of this stock are used at any one time. An externally threaded rod 42 may have small tapped openings 43 in each end and is cut to form the center core for the valve assembly. A disc or washer-shaped component 44 has an internally threaded opening 45 and may be threaded onto the threaded bar stock 42 to form a stop necessary in some valve assemblies. A typical washer 46 is shown which has an opening 47 for a screw to lock the washer onto a valve element. Other stops or spacers can be seen in elements 48 and 50 with spacer stop 48 having a threaded aperture 51 therethrough, while spacer 50 has a threaded aperture 52 passing therethrough. A second embodiment for the handle engaging portion 53 of the stem is shown having a square end 54, a threaded aperture 55 for a screw and a threaded aperture in the other end for threading onto the threaded rod 42. An alternate valve element 56 has an externally threaded portion 57 which can be threaded into any of the components having the internal threads of the size of threaded rod 42 and has a valve element 58 and stop 60 thereon. In the use of this embodiment, the threaded portion 57 would be coated with a solder or adhesive during the assembly along with coating of the threaded rod 42 prior to the heating or curing of the binding material. The handle engaging portion 61 for the stem has the externally threaded portion 62 of the same size as the externally threaded rod 42 and has a tapped opening 63 for receiving a screw. Similarly, a valve element 64 has an externally threaded portion 65 of a similar shape to the externally threaded rod 42 and a disc shaped valve element 66. Another common valve element 68 is illustrated having a base portion 70 having a ball joint socket 71 in one end thereof and may be threaded from the other end. The valve element disk 72 has a recess area 73 to receive a washer and a ball joint 74 mounted thereon. This type of valve element allows slippage on the ball joint when the valve is tightened to protect the washer from damage. The valve element 68 advantageously can be substituted in replacement valves having different types of valve elements when assembled in accordance with the present invention, thereby providing a substitute improved valve assembly. The elements shown in FIG. 4 are only a few that would be utilized in a typical kit for assembly of hundreds of valve assemblies, and it is to be understood that there might be several sizes of valve assembly stem stock 67 having an internal threaded bore to cover different thicknesses of stems, and several different operating thread stock members 40 for the different threads used by different manufacturers, even though one stock piece 40 can make a large number of valves inasmuch as only small pieces are used. Some elements, such as valve element 56 can be expected to be used only infrequently. It should be clear at this point that a valve assembly method as well as a valve assembly have been provided, which can reduce inventories and costs in locating any of a large variety of valves. A typical plumbing supply house will still stock the more common valve assemblies, but with the use of the present invention, can substantially reduce the inventory, searching and backordering of valve assemblies. Accordingly, the present invention is not to be construed as limited to the forms shown, which are to be considered illustrative rather than restrictive.

I claim:

1. A method of making a replacement valve assembly comprising the steps of:

removing an existing valve assembly;

cutting a threaded rod to a predetermined length in accordance with the removed existing valve assembly;

cutting a sleeve having an internally threaded bore therethrough to make a stem portion in accordance with the removed existing valve assembly;

selecting an externally threaded member having a threaded bore therein to match the internal threads of the valve having the valve assembly removed with the external threads of said selected member;

selecting a valve element of fit said cut threaded rod in accordance with the removed valve assembly;

coating said cut threaded rod that a fluid material to bind components thereto; and assembling said cut sleeve, selected threaded member having a threaded bore therein and selected valve element onto said coated cut threaded rod to form a valve assembly.

2. The method in accordance with claim 1, in which the step of coating said cut threaded rod with a fluid material to bind components thereto includes the step of coating said cut threaded rod with a flux material and then coating with a solder paste.

3. The method in accordance with claim 2, including the step of heating said assembled valve assembly to bind said soldered components together.

4. The method in accordance with claim 1, in which the step of coating said cut threaded rod includes cleaning said cut threaded rod and coating said rod with a polymer adhesive material.

5. The method in accordance with claim 4, including the step of curing said polymer adhesive.

6. The method in accordance with claim 1, including the selecting of a handle stem portion having an internally threaded bore therein to fit said cut threaded rod in accordance with the removed valve assembly.

7. The method in accordance with claim 6, including the step of attaching a disc shaped stop having an internally threaded bore therethrough onto said cut threaded rod between said valve element and said cut sleeve threaded thereon.

8. The method in accordance with claim 1, including the step of cutting a portion off of said selected valve element to adjust the spacing thereon.

9. The method in accordance with claim 1, in which the step of selecting a threaded member having a threaded bore therein includes selecting a threaded member having a cross section diameter of larger size than the removed existing valve assembly operative threads thereby compensating for wear in the valve.

10. The method in accordance with claim 1, including the step of abrading said cut threaded rod cut sleeve and cutting said selected threaded member having a threaded bore therein to smooth the cut surfaces prior to assembling said valve assembly.

11. A method of making a replacement valve assembly comprising the steps of:

removing an existing valve assembly;

cutting a rod to a predetermined length in accordance with the removed existing valve assembly;

cutting a sleeve having an internal bore therethrough shaped to fit on said cut rod to make a stem portion in accordance with the removal existing valve assembly;

selecting an externally threaded member having a bore therethrough shaped to fit on said cut rod to match the threads of the removed valve assembly;

selecting a valve element to fit onto said cut rod in accordance with the removed valve assembly;

coating said cut rod with a fluid material to bind components thereto; and assembling said cut sleeve, selected threaded member having a bore therein and selected valve element onto said coated cut rod to form a valve assembly.

12. The method in accordance with claim 11, in which the step of coating said cut rod with a fluid material to bind components thereto includes a step of coating said rod with a solder material and heating said assembled valve assembly to bind said soldered components together.

13. The method in accordance with claim 11, in which said step of coating said cut rod includes cleaning said cut rod and coating said rod with a polymer adhesive material and curing said polymer adhesive to bind said components together.

14. The method in accordance with claim 11, including the step of selecting a handle stem portion having an internal bore therein to fit said cut rod in accordance with the removed valve assembly.

* * * * *